United States Patent
Tan et al.

(10) Patent No.: US 11,411,878 B2
(45) Date of Patent: Aug. 9, 2022

(54) DATA TRANSMISSION METHOD, COMPUTING DEVICE, NETWORK DEVICE, AND DATA TRANSMISSION SYSTEM

(71) Applicant: Huawei Technologies Co., Ltd., Shenzhen (CN)

(72) Inventors: Kun Tan, Beijing (CN); Shuihai Hu, Shenzhen (CN); Binzhang Fu, Beijing (CN); Kai Chen, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 17/006,196

(22) Filed: Aug. 28, 2020

(65) Prior Publication Data

US 2020/0396169 A1 Dec. 17, 2020

Related U.S. Application Data

(63) Continuation of application No. PCT/CN2019/087382, filed on May 17, 2019.

(30) Foreign Application Priority Data

Jun. 29, 2018 (CN) .................. 201810711997.X

(51) Int. Cl.
*H04L 47/283* (2022.01)
*H04L 47/11* (2022.01)
(Continued)

(52) U.S. Cl.
CPC ............ *H04L 47/283* (2013.01); *H04L 47/11* (2013.01); *H04L 47/31* (2013.01); *H04L 47/32* (2013.01); *H04L 47/6275* (2013.01)

(58) Field of Classification Search
CPC ....... H04L 47/283; H04L 47/31; H04L 47/32; H04L 47/11; H04L 47/12; H04L 47/10;
(Continued)

(56) References Cited

U.S. PATENT DOCUMENTS

2002/0161914 A1 10/2002 Belenki
2003/0185154 A1* 10/2003 Mullendore ............ H04L 43/16
370/230
(Continued)

FOREIGN PATENT DOCUMENTS

CA 2679951 A1 * 9/2008 ........... H04L 1/1877
CA 2758866 A1 * 10/2010 ............ H04L 47/76
(Continued)

OTHER PUBLICATIONS

Blake, S., et al., "An Architecture for Differentiated Services," RFC 2475, Dec. 1998, 36 pages.
(Continued)

*Primary Examiner* — Phong La
(74) *Attorney, Agent, or Firm* — Conley Rose, P.C.

(57) ABSTRACT

A data transmission method implemented by a network device, where the data transmission method includes receiving a first data packet sent by a transmit end, buffering the first data packet to a low-priority queue when the first data packet is sent by the transmit end during a first round-trip time (RTT) of a data transmission phase between the transmit end and a receive end, receiving a second data packet from the transmit end, buffering the second data packet to a high-priority queue when the second data packet is not sent by the transmit end during the first RTT, and forwarding the second data packet in the high-priority queue before the first data packet in the low-priority queue.

20 Claims, 9 Drawing Sheets

(51) Int. Cl.
  *H04L 47/31* (2022.01)
  *H04L 47/32* (2022.01)
  *H04L 47/6275* (2022.01)

(58) Field of Classification Search
  CPC ..... H04L 47/24; H04L 47/2441; H04L 47/27;
       H04L 47/6274; H04L 47/6275; H04L
       12/801; H04L 12/861; H04L 12/865
  See application file for complete search history.

(56) References Cited

U.S. PATENT DOCUMENTS

| | | | |
|---|---|---|---|
| 2005/0053077 A1* | 3/2005 | Blanc | H04L 49/103 370/395.72 |
| 2008/0037420 A1* | 2/2008 | Tang | H04L 1/1607 370/229 |
| 2008/0175146 A1 | 7/2008 | Van Leekwuck et al. | |
| 2020/0177311 A1* | 6/2020 | Ho | H04L 1/0045 |
| 2020/0396169 A1* | 12/2020 | Tan | H04L 47/2441 |

FOREIGN PATENT DOCUMENTS

| | | | |
|---|---|---|---|
| CA | 2806729 A1 * | 2/2012 | ............ G06Q 10/10 |
| CN | 101115013 A | 1/2008 | |
| CN | 105052095 A * | 11/2015 | ........... H04L 47/225 |
| CN | 105471750 A * | 4/2016 | |
| CN | 106027416 A | 10/2016 | |
| CN | 106953742 A | 7/2017 | |
| CN | 110166367 A * | 8/2019 | ............ H04L 47/34 |
| EP | 2869514 A1 * | 5/2015 | ........ H04L 47/6215 |
| JP | 6023368 B1 * | 11/2016 | ........ H04L 43/0864 |
| WO | 2005109782 A1 | 11/2005 | |
| WO | WO-2006056880 A2 * | 6/2006 | ........... H04L 69/163 |

OTHER PUBLICATIONS

Zhu, Y., et al., "Congestion Control for Large-Scale RDMA Deployments," SIGCOMM 15, London, United Kingdom, Aug. 17-21, 2015, pp. 523-536.
Cho, I., et al., "Credit-Scheduled Delay-Bounded Congestion Control for Datacenters," SIGCOMM 17, Los Angeles, CA, USA, Aug. 21-25, 2017, 14 pages.
Alizadeh, M., et al. "Data center TCP (DCTCP)," SIGCOMM 10, New Delhi, India, Aug. 30-Sep. 3, 2010, 12 pages.
Perry, J., et al., "Fastpass: A Centralized "Zero-Queue" Datacenter Network," SIGCOMM 14, Chicago, IL, USA, Aug. 17-22, 2014, 12 pages.
Jose, L., et al., "High Speed Networks Need Proactive Congestion Control," HotNets-XIV, Philadelphia, PA USA, Nov. 16-17, 2015, 7 pages.
Gao, P., et al., "pHost: Distributed Near-Optimal Datacenter Transpod Over Commodity Network Fabric," CoNEXT, Heidelberg, Germany, Dec. 1-4, 2015, 12 pages.
Handley, M., et al., "Re-architecting datacenter networks and stacks for low latency and high performance," SIGCOMM 17, Los Angeles, CA, USA, Aug. 21-25, 2017, pp. 29-42.
Postel, J., et al., "Transmission Control Protocol, DARPA Internet Program, Protocol Specification," RFC 793, Sep. 1981, 89 pages.
Ramakrishnan, K., et al., "The Addition of Explicit Congestion Notification (ECN) to IP," RFC 3168, Sep. 2001, 63 pages.
Floyd, S., et al., "Quick-Start for TCP and IP," RFC 4782, Jan. 2007, 82 pages.
Chu, J., et al., "Increasing TCP's Initial Window," RFC 6928, Apr. 2013, 24 pages.
Cheng, Y., et al., "TCP Fast Open," RFC 7413, Dec. 2014, 26 pages.
Padmanabhan, V., et al., "TCP Fast Start: A Technique for Speeding Up Web Transfers," Proc. IEEE Globecom 98 Internet Mini-Conference, Sydney, Australia, Nov. 1998, 7 pages.
Zhang, J., et al., "TFC: Token Flow Control in Data Center Networks," EuroSys 16, Apr. 18-21, 2016, London, United Kingdom, pp. 1-14.
Mittal, R., et al., "TIMELY: RTT-based Congestion Control for the Datacenter," SIGCOMM 15, Aug. 17-21, 2015, London, United Kingdom, pp. 537-550.

* cited by examiner

DATA TRANSMISSION METHOD, COMPUTING DEVICE, NETWORK DEVICE, AND DATA TRANSMISSION SYSTEM

CROSS-REFERENCE TO RELATED APPLICATIONS

This application is a continuation of International Patent Application No. PCT/CN2019/087382 filed on May 17, 2019, which claims priority to Chinese Patent Application No. 201810711997.X filed on Jun. 29, 2018. The disclosures of the aforementioned applications are hereby incorporated by reference in their entireties.

TECHNICAL FIELD

This application relates to the field of communications technologies, and in particular, to a data transmission method, related devices, and a data transmission system.

BACKGROUND

In a network, data transmission is performed between devices based on various types of communication protocols. For example, a Transmission Control Protocol (TCP) is a connection-oriented, reliable, byte stream-based transport layer communication protocol, is defined by Request for Comments (RFC) 793 released by the Internet Engineering Task Force (IETF), and is a transport layer protocol that is most widely used in a current network. To ensure reliable transmission of a data packet, the TCP is used to assign a sequence number (SN) to each data packet. For a data packet that has been successfully received, a receive end may reply a corresponding acknowledgement (ACK) to a transmit end, where the ACK carries a sequence number of the received data packet. If the transmit end has not received the acknowledgment in a proper round-trip time (RTT), a corresponding data packet is retransmitted. This mechanism is also commonly referred to as timeout retransmission. Although the TCP ensures reliable data transmission through the acknowledgment and the timeout retransmission mechanism, network resources (including link bandwidth, cache in a switching node, and the like) are usually limited. If in a period of time, there are too many data packets transmitted in the network, transmission performance of the network deteriorates drastically. This case is called network congestion. When congestion occurs in the network, generally, the following may occur a data packet loss, a transmission delay increase, and a throughput decrease. In a severe case, a congestion collapse may occur.

To prevent network congestion, the TCP introduces a series of congestion control algorithms, including algorithms of "slow start" and "congestion avoidance" that are originally proposed by V. Jacobson in a paper in 1988, and algorithms of "fast retransmit" and "fast recovery" that are subsequently added in a TCP Reno version. A common point of these congestion control algorithms is that a data sending rate is adjusted based on a congestion window. A congestion window size, namely, a cwnd value, represents a maximum quantity of data packets that can be sent but are not responded with ACKs. A larger window indicates a higher data sending rate, but may indicate higher congestion occurring probability in the network. If a window value is 1, then each data packet sent will have to wait for an ACK before a second data packet can be sent. Data transmission efficiency is low. A best cwnd value is selected such that network throughput maximization and zero congestion are cores of a congestion control algorithm.

FIG. 1 shows a main process of TCP congestion control according to the other approaches, including a slow start phase, a congestion avoidance phase, a fast retransmit phase, and a fast recovery phase, where there are two important parameters: cwnd and slow start threshold (ssthresh). In all of these phases, a data sending rate is controlled by changing the two parameters. As shown in FIG. 1, in the slow start phase, a transmit end first sends one data packet (cwnd=1). If a receive end successfully receives the data packet, the transmit end starts to send two data packets (cwnd=2). If the receive end successfully receives the two data packets, the transmit end sends four data packets (cwnd=4). To be specific, the congestion window size increases exponentially until reaching a specified slow start threshold ssthresh. When cwnd=ssthresh, it enters the congestion avoidance phase. In the congestion avoidance phase, cwnd no longer increases in the foregoing exponential manner, but increases linearly. To be specific, after an ACK of the receive end is received each time, only 1/cwnd data packet is added. In this way, in an RTT, cwnd is increased by one at most. When cwnd=24, if a timeout occurs, cwnd is reset to 1, and the slow start threshold ssthresh is reduced. For example, ssthresh=current cwnd/2.

It can be learned that, according to an existing congestion control algorithm, when a network status is good, impact on a network is avoided by slowly increasing a data sending rate. In addition, when a packet loss is detected, the data sending rate is radically reduced, to avoid further deterioration of the network status. This is a "congestion prevention"-based congestion control algorithm. According to this algorithm, although network congestion can be suppressed to some extent, a data transmission rate may be improperly limited, which increases a data transmission delay, and reduces network bandwidth utilization. Particularly, in environments such as a wireless network, a data center network and a remote direct memory access (RDMA) network, the following cases, caused by the existing congestion control algorithm, commonly exist a throughput rate is reduced, a data transmission delay is large, and network bandwidth is wasted.

SUMMARY

Embodiments of this application provide a data transmission method, related devices, and a data transmission system, and aim to reduce network congestion, fully utilize network bandwidth, increase a data transmission rate, and reduce a data transmission delay.

To achieve the foregoing disclosure purposes, according to a first aspect, an embodiment of this application provides a data transmission method. The method includes sending, by a transmit end, a plurality of data packets in the first RTT of a data transmission phase between the transmit end and a receive end at a high rate (a line rate or any user-defined rate), and adding a first tag to the plurality of data packets sent in the first RTT such that after receiving the data packet that carries the first tag, a network device buffers the data packet that carries the first tag to a low-priority queue or discards the data packet that carries the first tag, where a data packet in a high-priority queue of the network device is forwarded in preference to a data packet in the low-priority queue, and the data packet buffered in the high-priority queue does not carry the first tag. According to the method, network free bandwidth is utilized to quickly start a new data flow without a delay, and marks the data packet sent in an initial RTT such that the network device forwards the packet sent in the initial RTT at a lower priority, to reduce impact on an old flow (a packet sent in a non-initial RTT) caused by the quick start of the new flow, and reduce network congestion probability.

In a possible design, the transmit end may adjust a sending rate or a quantity of sent data packets in a next RTT based on a quantity of data packets that are successfully received by the receive end and that are in the plurality of data packets sent in the first RTT, and send the data packets in a next RTT based on an adjusted sending rate or the quantity of the data packets. Therefore, congestion control is performed in time based on a perceived network condition in order to avoid rapid deterioration of the network condition.

In a possible design, the transmit end may add a second tag to the data packet sent in the non-initial RTT to indicate that the data packets are sent in the non-initial RTT. The network device buffers the data packet to the high-priority queue based on the second tag carried in the data packet, and the data packet is forwarded in preference to a data packet sent in the initial RTT, to reduce impact on the old flow (the packet sent in the non-initial RTT).

In a possible design, the first tag or the second tag is a field or a specific bit of a header of the data packet.

In a possible design, before sending a data packet, the transmit end first establishes a communication connection to the receive end. The foregoing first RTT or initial RTT is the first RTT after the communication connection is established.

In a possible design, the transmit end performs data transmission during a process in which the transmit end establishes a communication connection to the receive end. The foregoing first RTT or initial RTT is the first RTT of a communication connection establishment phase.

In a possible design, the transmit end determines, based on an ACK received from the receive end, a quantity of data packets that are successfully received by the receive end and that are in the plurality of data packets sent in the first RTT.

In a possible design, an upper limit of a quantity of data packets allowed to be sent by the transmit end in the second RTT has a linear relationship with the quantity of the data packets that are successfully received by the receive end and that are in the data packets sent in the first RTT.

According to a second aspect, an embodiment of this application provides a data transmission method, including receiving, by a network device, a data packet sent by a transmit end, and buffering, by the network device, the data packet to a low-priority queue if the data packet is sent by the transmit end in the first RTT of a data transmission phase between the transmit end and a receive end, or buffering, by the network device, the data packet to a high-priority queue if the data packet is not sent in the first RTT, where a data packet in the high-priority queue is forwarded in preference to a data packet in the low-priority queue.

Using the foregoing method, the network device distinguishes a data packet sent in an initial RTT and a data packet sent in a non-initial RTT, and gives a higher forwarding priority to the data packet sent in the non-initial RTT. Therefore, impact on an old flow (a packet sent in the non-initial RTT) caused by fast packet delivery in the initial RTT is reduced, and network congestion probability is reduced.

In a possible design, the transmit end adds a specific tag to the data packet sent in the initial RTT, and the network device determines, based on the tag carried in the received data packet, whether the data packet is sent by the transmit end in the initial RTT.

In a possible design, the network device maintains a flow table used to record all active flow information. If 5-tuple information of a flow cannot be found in the flow table, the flow is classified as a new flow, and a new flow record is inserted into the flow table. Subsequently, when the data packet is looked up from the table, the newly inserted flow entry may be hit, and it is determined, based on content of the flow entry, that the current data packet belongs to a new flow, that is, a packet sent in the initial RTT. After a new flow ends data transmission in the first RTT, a flow entry is updated to "old flow". Therefore, all subsequent data packets of the flow are identified, based on the updated flow entry, as packets sent in the non-initial RTT.

In a possible design, each flow record in the flow table has a valid time. If the flow does not subsequently send any new data packet in the valid time, the flow record is deleted.

According to a third aspect, an embodiment of this application provides a data transmission method, including receiving, by a network device, a data packet sent by a transmit end, and discarding, by the network device, the data packet if the data packet is sent by the transmit end in the first RTT of a data transmission phase between the transmit end and a receive end, and a quantity of data packets in a receive queue of the network device exceeds a specified threshold, or adding, by the network device, the data packet to the receive queue if the data packet is not sent in the first RTT and the receive queue is not full.

Using the foregoing method, the network device selectively discards, based on a depth of the receive queue, a data packet sent in an initial RTT. Therefore, impact on an old flow (a packet sent in a non-initial RTT) caused by fast packet delivery in the initial RTT is reduced, and network congestion probability is reduced.

In a possible design, if the data packet is not sent in the first RTT and the receive queue is full, the network device discards the data packet.

In a possible design, if the data packet is not sent in the first RTT and the receive queue is full, the network device discards one data packet in the receive queue, where the discarded data packet is a data packet sent by the transmit end in the first RTT.

In a possible design, the transmit end adds a specific tag to the data packet sent in the initial RTT, and the network device determines, based on the tag carried in the received data packet, whether the data packet is sent by the transmit end in the initial RTT.

In a possible design, the network device maintains a flow table used to record all active flow information. If 5-tuple information of a flow cannot be found in the flow table, the flow is classified as a new flow, and a new flow record is inserted into the flow table. Subsequently, when the data packet is looked up from the table, the newly inserted flow entry may be hit, and it is determined, based on content of the flow entry, that the current data packet belongs to a new flow, that is, a packet sent in the initial RTT. After a new flow ends data transmission in the first RTT, a flow entry is updated to "old flow". Therefore, all subsequent data packets of the flow are identified, based on the updated flow entry, as packets sent in the non-initial RTT.

In a possible design, each flow record in the flow table has a valid time. If the flow does not subsequently send any new data packet in the valid time, the flow record is deleted.

According to a fourth aspect, an embodiment of this application provides a computing device. The computing device has functions of implementing the transmit end in the foregoing method examples. The functions may be implemented by hardware, or implemented by executing corresponding software by hardware. The hardware or the software includes one or more modules corresponding to the foregoing functions.

In a possible design, the computing device includes a processor, a memory, and a network interface card, where the network interface card is configured to receive a data packet and send a data packet, and the processor runs a protocol stack program in the memory, to perform the functions of the transmit end in the foregoing method examples.

In another possible design, the computing device structurally includes a receiving unit, a processing unit, and a sending unit. These units may perform the corresponding functions in the foregoing method examples. For example, the receiving unit and the sending unit are respectively configured to receive and send a data packet, and the processing unit is configured to process the data packet, for example, add a first and/or second tag.

According to a fifth aspect, an embodiment of this application provides a network device. The network device has functions of implementing the network device in any one of any aspect or any possible implementation of the aspect. The functions may be implemented by hardware, or implemented by executing corresponding software by hardware. The hardware or the software includes one or more modules corresponding to the foregoing functions.

In a possible design, the network device includes a processor, a memory, and an input/output port. The input/output port is configured to receive a data packet and send a data packet, and the processor runs a protocol stack program in the memory, to perform the functions of the network device in the foregoing method examples, for example, identify a data packet sent in an initial RTT, buffer the data packet to a receive queue, and discard the data packet when the receive queue is full or a depth of the queue exceeds a specified threshold.

In a possible design, the network device structurally includes a receiving unit, a processing unit, and a sending unit. These units may perform the corresponding functions in the foregoing method examples. For example, the receiving unit and the sending unit are respectively configured to receive and send a data packet, and the processing unit is configured to process the data packet, for example, identify a data packet sent in an initial RTT, buffer the data packet to a receive queue, and discard the data packet when the receive queue is full or a depth of the queue exceeds a specified threshold.

In a possible design, the receiving unit and the sending unit are transceivers, network interface cards, or communications interfaces, and the processing unit is a processor, or a hardware circuit or a special-purpose chip, for example, a field programmable gate array (FPGA) or an application-specific integrated circuit (ASIC).

According to a sixth aspect, an embodiment of this application provides a network interface card, including an input/output port and a processor, where the processor is configured to send a plurality of data packets in the first RTT of a data transmission phase between a transmit end and a receive end through the input/output port, and add a first tag to the plurality of data packets sent in the first RTT such that after receiving the data packet that carries the first tag, a network device buffers the data packet that carries the first tag to a low-priority queue or discards the data packet that carries the first tag, where a data packet in a high-priority queue of the network device is forwarded in preference to a data packet in the low-priority queue, and the data packet buffered in the high-priority queue does not carry the first tag.

According to another aspect, an embodiment of this application provides a computing device. The computing device includes the foregoing network interface card.

According to still another aspect, an embodiment of this application provides a data transmission system. The system includes the foregoing computing device and the foregoing network device.

According to yet another aspect, an embodiment of this application provides a computer storage medium configured to store computer software instructions used by the foregoing computing device or network device. The computer storage medium includes a program designed for executing the foregoing aspects.

Compared with the other approaches, in the solutions provided in the embodiments of this application, according to the data transmission method provided in the embodiments of this application, a transmit end sends a large quantity of data packets in an initial RTT after a TCP connection is established such that free network bandwidth is fully utilized to quickly start a new data flow without a delay. In addition, flow classification is performed using whether a data flow is a new flow as a standard, and different network transmission priorities are set for different flows in order to prevent a data packet of a new flow from interfering with transmission of a data packet of an old flow, which causes network congestion. In other words, according to the data transmission method provided in the embodiments of this application, a better balance is achieved between network bandwidth utilization and network congestion probability, and network congestion is avoided as much as possible while network bandwidth is fully utilized.

BRIEF DESCRIPTION OF DRAWINGS

To describe the technical solutions in some of the embodiments of this application more clearly, the following briefly describes the accompanying drawings in some of the embodiments of this application.

DESCRIPTION OF EMBODIMENTS

Figure 1:
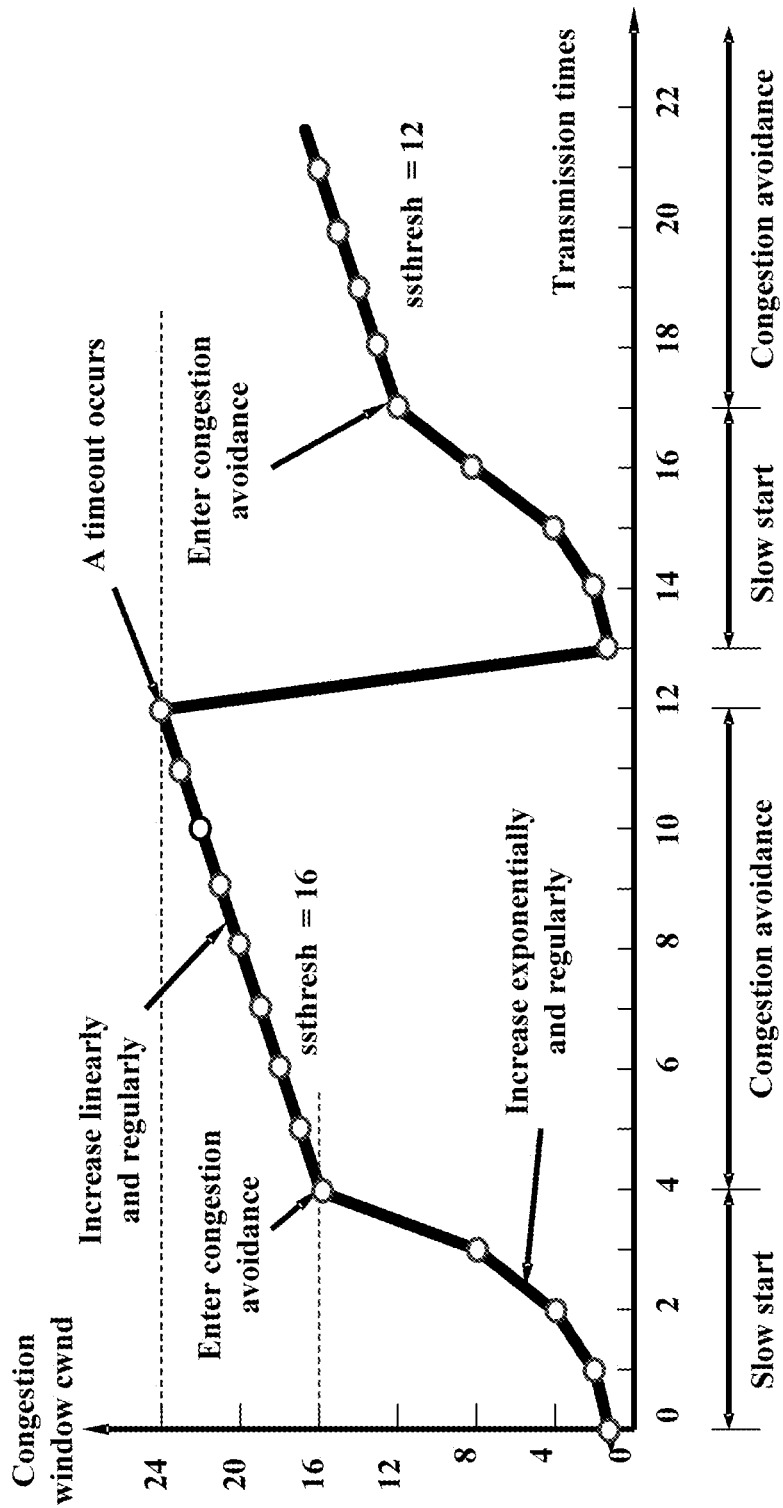
FIG. 1 is a schematic diagram of a congestion control algorithm.

The following describes the technical solutions in the embodiments of this application in detail with reference to the accompanying drawings in the embodiments of this application. The described embodiments are merely some rather than all of the embodiments of this application.

Before starting to describe specific embodiments of this application, the following first describes terms and meanings thereof that may be mentioned in the following embodiments of this application. It can be understood that, unless otherwise stated, these terms and the meanings thereof in the embodiments of this application may be the same.

Data packet: It is also referred to as a packet, is a basic unit of network transmission, and is data organized in a particular format. In different types of network protocols, a format of a data packet has different definitions. However, generally, a data packet may be divided into a header and a payload, where the header includes information necessary for a data packet transmission process, for example, address information and a flag bit, and the payload is also referred to as a data part of the data packet, and includes to-be-sent data content.

Switch: It is a network device that can forward a data packet, and can provide more connection ports for a network in order to connect more devices to the network.

Switch queue: It is a functional unit that is in a switch and that is configured to store a received data packet.

Server: It is a device that provides a computing service. The server needs to respond to a service request and process the service request. Therefore, generally, the server needs to have capabilities of bearing a service and securing the service. In a network environment, based on different types of services provided by the server, the server is classified into a file server, a database server, an application server, a WEB server, and the like.

Terminal device: It is a device that provides voice and/or data connectivity for a user, and includes a wireless terminal or a wired terminal. The wireless terminal may be a mobile terminal, for example, a mobile phone (cellular phone), or a computer having a mobile terminal, for example, a portable, pocket, handheld, computer built-in or vehicle-mounted mobile apparatus.

Data Center: The data center is a set of complex facilities. It includes not only a computer system and other supporting devices (for example, communications and storage systems), but also a data communications network, an environment control device, and a monitoring device, and various security apparatuses. These devices are placed together because they have same environmental requirements and physical security requirements, and are placed for ease of maintenance.

Data center network: It is a network that connects all computer systems in a data center.

Network bandwidth: The network bandwidth is a volume of data that can be transmitted in a unit time (which is generally one second).

Data flow: It is a group of data packets sent from one computing device (for example, a server A) to another computing device (for example, a server B) in a network. A definition mode of the data flow may vary with different requirements of an application. Generally, a data flow is defined by a 5-tuple (a source Internet Protocol (IP) address, a destination IP address, a source port number, a destination port number, and a protocol type).

Network congestion: The network congestion is a case that when a volume of data transmitted in a network is too large, network transmission performance is degraded due to limited network resources. Generally, when load in the network is excessively increased and network performance is degraded, the network congestion may occur.

Congestion control: It is used to resolve or alleviate network congestion using a particular method. The congestion control needs to ensure that a network can carry traffic submitted by a user, is a global problem, and relates to many factors such as a host and a switch. Main parameters used to measure whether the network is congested are a data packet loss rate, a switch queue depth (average or instantaneous), a quantity of data packets in timeout retransmission, an average transmission delay, and the like.

Congestion control algorithm: It is an algorithm used to resolve network congestion.

ACK: It is a control packet sent by a receive end to a transmit end in a data transmission process, and is used to indicate that reception of data sent by the transmit end has been acknowledged.

RTT: It is an important performance indicator in network transmission, and indicates a total delay from a moment when a transmit end sends data packet to a moment when the transmit end receives an ACK of that data packet from the receive end. The RTT includes three parts a propagation time of a link, a processing time of the transmit end and the receive end, and a queuing and processing time of buffering of an intermediate network device. Values of the first two parts are relatively fixed, but the queuing and processing time of the buffering of the network device varies with a congestion degree of an entire network. Therefore, a change of the RTT reflects a change of the network congestion degree to some extent.

TCP: It is a connection-oriented, reliable, byte stream-based transport layer communication protocol, and is defined by RFC 793 of the IETF.

Explicit Congestion Notification (ECN): It is an extension to a TCP protocol, and is defined by RFC 3168 of the IETF. The ECN allows end-to-end notification of congestion control to avoid a packet loss. The ECN is an optional function. If supported by an underlying network facility, the ECN may be used by two endpoints that enable the ECN. Generally, a network indicates channel blocking by discarding a data packet. When the ECN is successfully negotiated, a switch that supports the ECN may set a tag in a header of a data packet instead of discarding the data packet, to indicate that congestion is about to occur. After detecting that a data packet is marked by a network device, a receive end of the data packet makes a corresponding tag in a returned ACK to indicate that a network of a transmit end is congested. Accordingly, the transmit end lowers its own transmission rate in the same manner as that used when a packet loss is detected in a conventional TCP congestion control algorithm.

RDMA: It is a technology that is generated to resolve a delay of server-side data processing in network transmission. The RDMA quickly moves data from one server to a memory of another server in a manner of unloading a protocol stack from a network interface card. The entire process does not require participation of an operating system (a kernel bypass) such that CPU load can be reduced.

Data plane development kit (DPDK): It is a set of development platforms and interfaces for quickly processing a data packet. The DPDK provides a simple and complete architecture for fast data packet processing and network transmission at an application layer. The DPDK allows directly sending of a data packet packaged in the application layer to a network interface card, and participation of an operating system is not needed in the process. Therefore, memory and central processing unit (CPU) load can be reduced.

In the description of the embodiments of this application, unless otherwise stated, "a plurality of" means two or more.

Figure 2:
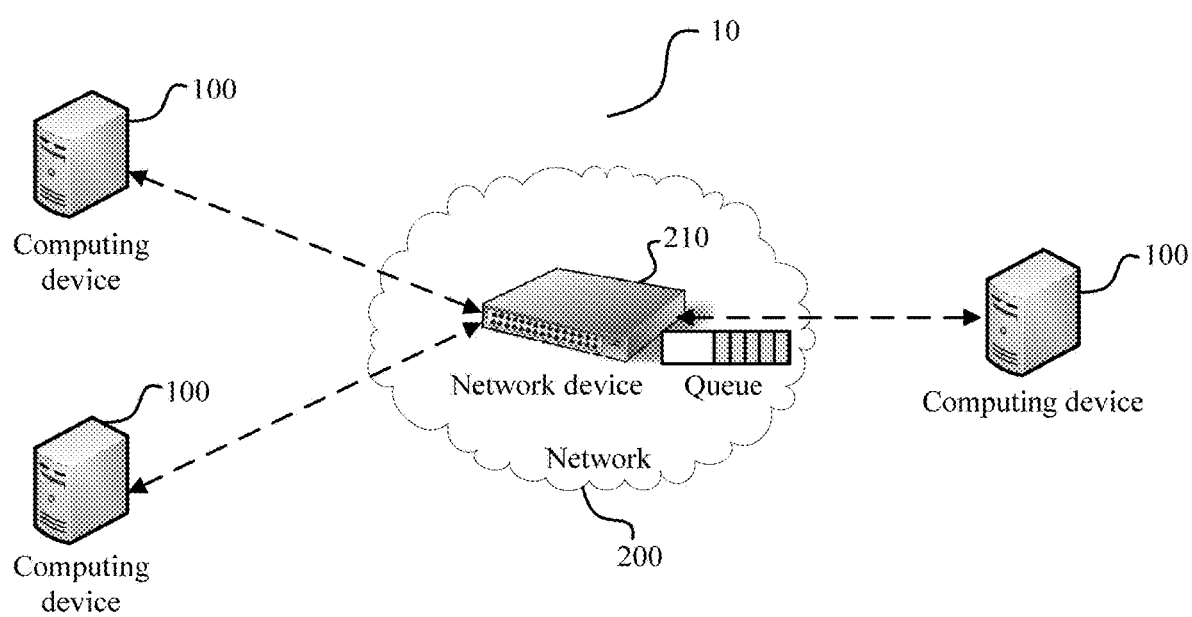
FIG. 2 is an architectural diagram of a data transmission system according to an embodiment of this application.

FIG. 2 is a simplified architecture of a data transmission system 10 to which the solutions of the present disclosure are applicable. As shown in FIG. 2, a plurality of computing devices 100 are in communication connection through a network 200. The computing device 100 may be any device having a data transceiving capability, for example, a server, a terminal device, or a virtual machine. The network 200 may be a data center network, the Internet, a local area network, a wide area network, or the like. The network 200 includes one or more network devices 210, for example, devices such as a switch, a gateway, and a router that can implement data packet forwarding. Two devices establish a communication connection using communication-related components, such as a protocol stack and a network interface card, and transmit data in units of data packets based on the established connection. A data packet may pass through the one or more network devices 210 in the network 200 during transmission. The network device 210 first buffers the received data packet in a switch queue, and then forwards the received data packet to another device. For ease of description, one of the two devices that have established a communication connection in the embodiments of this application is referred to as a transmit end, and the other is referred to as a receive end. It can be understood that the transmit end and the receive end may be any device having a data transceiving capability. For example, the transmit end is a server, and the receive end is another server, or the transmit end is a terminal device, and the receive end is a server, or the transmit end and the receive end are both terminal devices. In addition, the transmit end and the receive end are two relative roles, and may be interchanged. To be specific, a same device may be a transmit end or a receive end in different scenarios.

A person skilled in the art can understand that, a data transmission system may generally include fewer or more components than those shown in FIG. 2, or include components different from those shown in FIG. 2. FIG. 2 merely shows components more related to a plurality of implementations disclosed in the embodiments of this application.

The data transmission system 10 shown in FIG. 2 is only a typical application scenario of the present disclosure, and should not be construed as limitation to an application scenario of the present disclosure.

In the data transmission system, a phenomenon of a data packet loss may inevitably exist in data transmission. Therefore, to ensure reliable data transmission, the data transmission system usually introduces congestion control algorithms such as slow start and congestion avoidance to suppress network congestion. However, these congestion control algorithms also greatly limit a data transmission rate of data, increase a transmission delay, and reduce bandwidth utilization. An embodiment of this application provides a data transmission method, and aims to reduce network congestion, fully utilize network bandwidth, increase a data transmission rate, and reduce a data transmission delay. The method may be used for a device that performs data transmission based on a TCP. It can be understood that another network that allows a packet loss may also use this method for congestion control.

Figure 3:
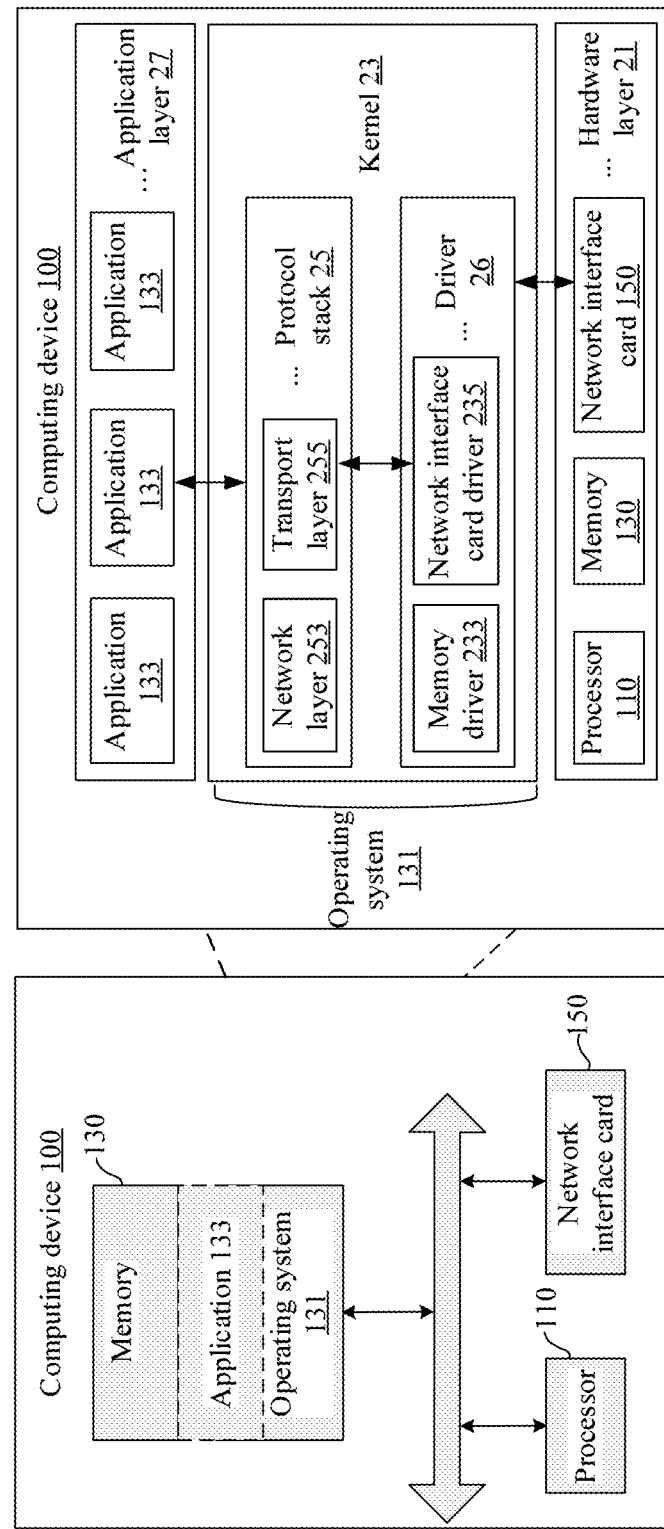
FIG. 3 is a schematic structural diagram of a computing device according to an embodiment of this application.

FIG. 3 is a schematic structural diagram of an example of a computing device 100 according to an embodiment of this application. As shown in FIG. 3, the computing device 100 includes components such as a processor 110, a memory 130, and a network interface card (NIC) 150. These components can communicate with each other over one or more communications buses or signal cables. A person skilled in the art can understand that the computing device 100 may include more or fewer components than those shown in the figure, or a combination of some of these components.

The processor 110 is a control center of the computing device 100, and is connected to the components of the computing device 100 using a plurality of interfaces and buses. In some embodiments, the processor 110 may include one or more processing units.

Executable programs, such as an operating system 131 and an application 133 shown in FIG. 3, are stored in the memory 130. The processor 110 is configured to execute the executable program in the memory 130 to implement a function defined by the program. For example, the processor 110 executes the operating system 131 to implement various functions of the operating system on the computing device 100. The memory 130 further stores other data than the executable programs, such as data generated during operation of the operating system 131 and the application 133. The memory 130 may include one or more storage devices. In some embodiments, the memory 130 is a non-volatile storage medium, and generally includes an internal memory and an external memory. The internal memory includes but is not limited to a random-access memory (RAM), a read-only memory (ROM), a cache, or the like. The external memory includes but is not limited to a flash memory, a hard disk, a Universal Serial Bus (USB) disk, or the like. The executable program is generally stored on the external memory. Before executing the executable program, the processor loads the program from the external memory to the internal memory.

The memory 130 may be independent and is connected to the processor 110 using a bus, and the memory 130 may alternatively be integrated with the processor 110 to a chip subsystem.

The network interface card 150 is a hardware unit that implements functions such as data packet transmission and reception, data packet encapsulation and decapsulation, medium access control, and data buffering. The network interface card 150 includes a processor, a memory (including a RAM and/or a ROM), and an input/output port, where the input/output port is configured to receive and send a data packet, the memory is configured to buffer the received data packet or the to-be-sent data packet, and the processor runs a program in the memory to process the data packet, for example, encapsulation/decapsulation.

The operating system 131 carried in the computing device 100 may be Linux®, Windows®, or another operating system. No limitation is imposed on this in this embodiment of this application.

Further, in an embodiment, as shown in FIG. 3, the computing device 100 may logically be partitioned into a hardware layer 21, the operating system 131, and an application layer 27. The hardware layer 21 includes hardware resources such as the processor 110, the memory 130, and the network interface card 150. The application layer 31 includes one or more applications, such as the application 133. The operating system 131 is used as software middleware between the hardware layer 21 and the application layer 31, and is an executable program for managing and controlling hardware and software resources.

The operating system 131 includes a kernel 23. The kernel 23 is configured to provide underlying system components and services, for example, power management, memory management, a protocol stack 25, and a hardware driver 26. The protocol stack 25 is a component that implements a network protocol. In an embodiment, the hardware driver 26 includes a memory driver 233 and a network interface card driver 235. In an embodiment, the protocol stack 25 includes a network layer protocol component 253 and a transport layer protocol component 255 that are respectively configured to implement network protocol functions of a network layer and a transport layer. The data transmission method provided in this embodiment of this application may be implemented by the transport layer protocol component 255 in the kernel 12.

Figure 4:
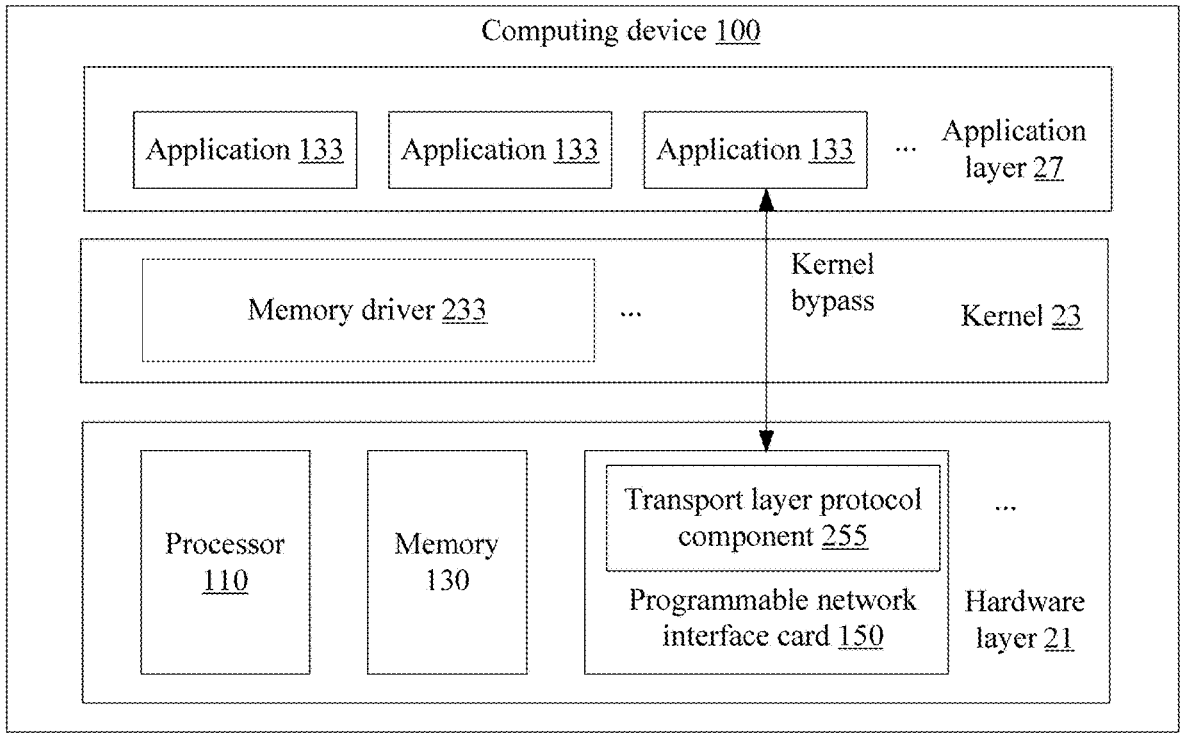
FIG. 4 is a schematic structural diagram of a computing device according to another embodiment of this application.

In an embodiment, the computing device 100 may unload functions of related components of the protocol stack to the network interface card, thereby implementing a kernel bypass and improving data forwarding performance. As shown in FIG. 4, the network interface card 150 is a programmable network interface card, and the transport layer protocol component 255 is implemented in the programmable network interface card 150. Correspondingly, the data transmission method provided in the embodiments of this application may be implemented by the network interface card 150. For example, the method may be implemented by modifying hardware or firmware of the network interface card 150.

Figure 5:
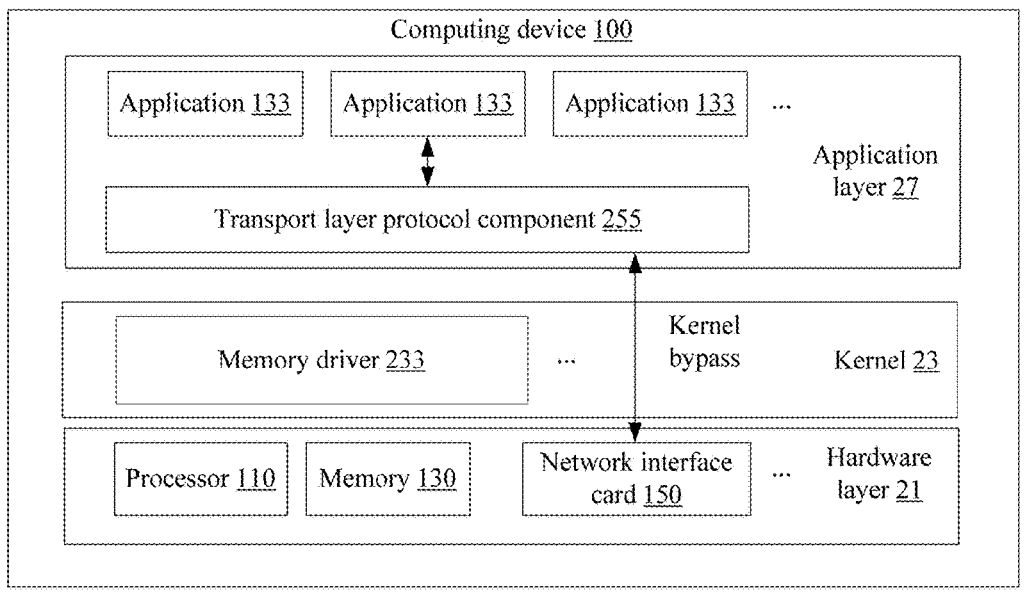
FIG. 5 is a schematic structural diagram of a computing device according to still another embodiment of this application.

In an embodiment, as shown in FIG. 5, the computing device 100 may implement the transport layer protocol component 255 at an application layer (for example, a DPDK technology), thereby implementing a kernel bypass and improving data forwarding performance. Correspondingly, the data transmission method provided in this embodiment of this application may be implemented by software of an application layer.

Figure 6:
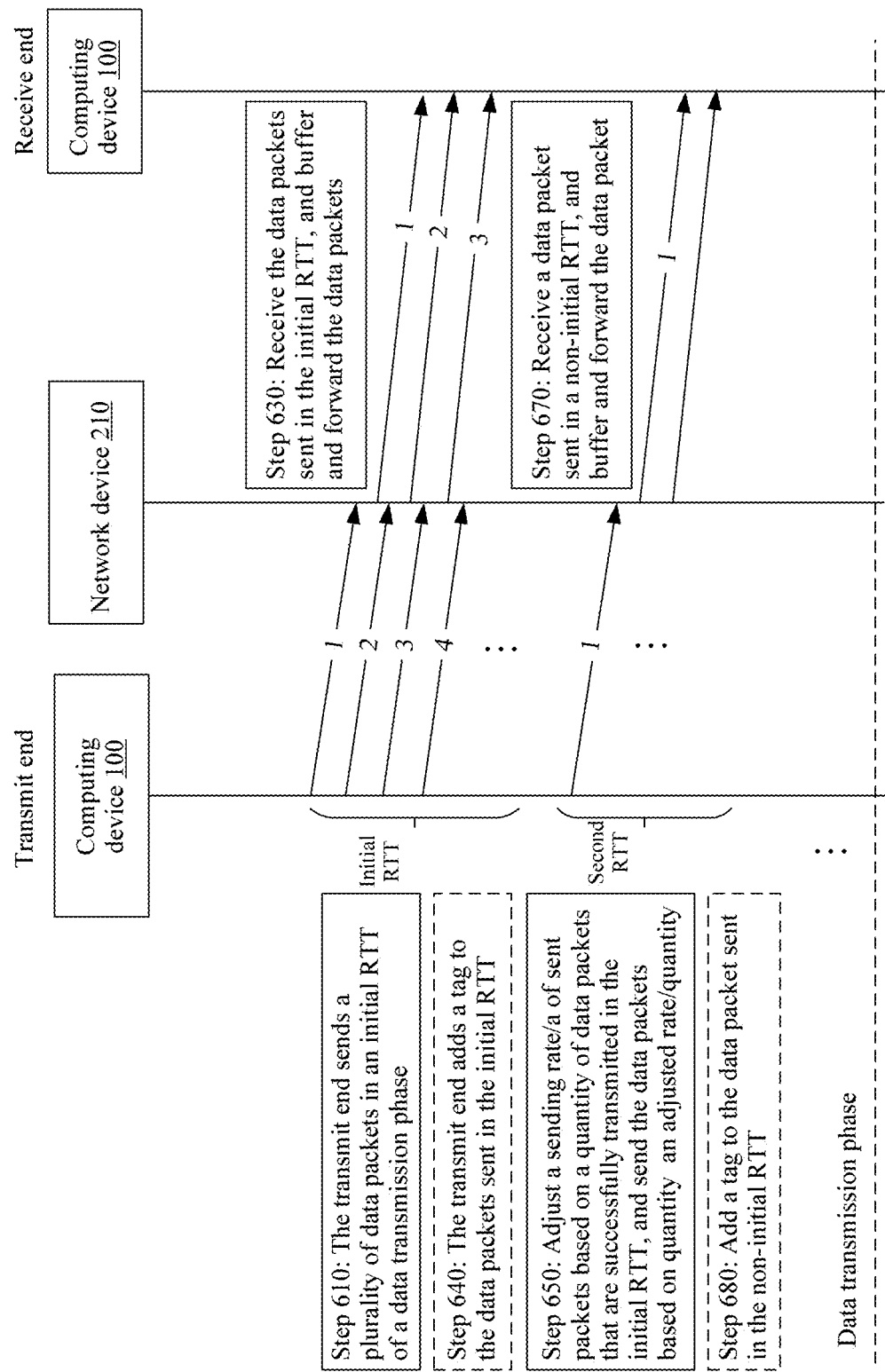
FIG. 6 is a flowchart of a data transmission method according to an embodiment of this application.

FIG. 6 is a schematic flowchart of a data transmission method according to an embodiment of this application. For ease of description, one of two computing devices 100 that perform data transmission using a network device 210 in this embodiment of this application is referred to as a transmit end, and the other is referred to as a receive end. As shown in FIG. 6, the data transmission method includes the following steps.

Step 610: The transmit end sends a plurality of data packets in an initial RTT of a data transmission phase between the transmit end and the receive end, or sends a data packet in an initial RTT at a high rate (a line rate or any user-defined rate). The RTT is a time from a moment when the transmit end sends data to a moment when the transmit end receives an acknowledgment from the receive end. The RTT is not a fixed value, but a measurement value, and may change with a congestion degree of an entire network. The initial RTT is duration from a moment when the transmit end sends an initial data packet to a moment when the transmit end receives an acknowledgment from the receive end. In a data transmission process, the transmit end may dynamically estimate an RTT value based on a timestamp at which a data packet is sent and a timestamp at which an acknowledgment is received. Therefore, the RTT may vary with the network congestion degree.

In step 610, before receiving the acknowledgment from the receive end, the transmit end may send a plurality of data packets without limit, unlike a slow start mechanism in the other approaches in which only one data packet is sent. The plurality of data packets herein include at least two data packets, and preferably include more than two data packets, or even far more than two data packets. The data transmission phase is relative to a connection establishment phase. In order to implement data transmission between the transmit end and the receive end, a communication connection needs to be established. A connection establishment phase usually relates to one or more times of message exchange. "Initial RTT" described in the embodiments of this application generally means the first RTT for data transmission after the communication connection between the transmit end and the receive end is established. In some special cases, the connection establishment phase and the data transmission phase may not be serial, but in parallel. To be specific, the transmit end starts data transmission in a process in which the transmit end establishes a connection to the receive end. In this case, "initial RTT" means the first RTT in which the transmit end starts to transmit data to the receive end.

Step 630: The network device 210 receives one or more of the plurality of data packets, buffers the one or more of the plurality of data packets to a receive queue, and forwards the one or more of the plurality of data packets on an appropriate occasion.

Step 650: The transmit end adjusts, based on a quantity of data packets that are successfully received by the receive end and that are in the data packets sent in the initial RTT, a quantity or a sending rate of data packets sent in a next RTT (a non-initial RTT), that is, the second RTT, and continues to send data packets based on an adjusted quantity or sending rate. For example, if the quantity of the data packets that are successfully received by the receive end and that are in the data packets sent in the initial RTT is N, an upper limit of data packets allowed to be sent in a next RTT may be adjusted to be N, N+1, or an integer value having a linear relationship with N.

It should be noted that, "a quantity of data packets that are successfully received by the receive end" in step 650 is usually determined or estimated by the transmit end based on feedback of the receive end, and there may be an error between the quantity and an actual quantity of data packets that are successfully received by the receive end. In an embodiment, when receiving a data packet each time, the receive end may reply a corresponding ACK to a sending node, which indicates that the receive end has successfully received the data packet. Correspondingly, the transmit end determines, based on the ACK received from the receive end, the quantity of the data packets that are successfully received by the receive end and that are in the plurality of data packets sent in the first RTT. In an embodiment, the receive end may also feed back, using an ACK carrying an extension field, information about the plurality of data packets that have been successfully received, or information about one or more data packets that have not been successfully received. The transmit end can determine, based on the extension field in the received ACK, the data packets that are successfully received by the receive end and that are in the plurality of data packets sent in the first RTT, and then determine the quantity of the data packets.

Step 670: The network device 210 receives one or more data packets sent by the transmit end in the non-initial RTT, buffers the one or more data packets to a receive queue, and forwards the one or more data packets on an appropriate occasion.

To reduce network congestion, the network device 210 may perform differentiated operations on a data packet sent in the initial RTT and a data packet sent in the non-initial RTT. The network device 210 may use various manners to distinguish the data packet sent by the transmit end in the initial RTT and the data packet sent by the transmit end in the non-initial RTT.

In an embodiment, as shown in step 640 in FIG. 6, the transmit end may add a first tag to the data packet sent in the initial RTT such that the network device 210 can quickly identify the data packet sent in the initial RTT.

Optionally, as shown in step 680, the transmit end may also add a second tag to the data packet sent in the non-initial RTT such that the network device 210 can quickly identify the data packet sent in the non-initial RTT. The first tag or the second tag may be located in an extension field, for example, an option field or a reserved field, of a header of the data packet. In an embodiment, the first tag or the second tag may be an ECN bit of the header of the data packet. When the ECN bit is a specific value (for example, 0 or 1), the ECN bit is used to indicate that the data packet is a data packet sent in the initial RTT. Correspondingly, after receiving any data packet, the network device 210 can determine, based on the tag carried in the data packet, whether the data packet is a data packet sent in the initial RTT.

In another embodiment, the network device 210 may maintain a flow table that records all active data flow information, and perform new and old flow classification based on the flow table to determine whether the data packet is sent in the initial RTT. An active data flow is a data flow that has completed data transmission in an initial RTT. If 5-tuple information of a flow cannot be found in the flow table, the flow is classified as a new flow, and a new flow record is inserted into the flow table. If the flow table is looked up based on a 5-tuple of the data packet, and a new inserted flow entry is hit, it is determined that the current data packet belongs to a new flow, that is, a data packet sent in the initial RTT. After a new flow ends data transmission in the first RTT, a flow entry is updated to "old flow". Therefore, all subsequent data packets are identified, based on the updated flow entry, as an old flow, that is, data packets sent in the non-initial RTT. Optionally, each flow record in the flow table has a valid time. If the flow does not transmit any new data packet in the valid time, the flow record is deleted. Otherwise, a next valid time starts after the valid time expires.

In an embodiment, in step 650, after the data transmission in the first RTT, a flow rate in the second RTT can be calculated according to the following method (1) or (2).

(1) The flow rate of the second RTT is determined based on a quantity of data packets that are successfully transmitted in the first RTT. Assuming that a congestion window is initialized to 1 (cwnd=1), the congestion window does not work in the first RTT. In the second RTT, a value of cwnd is increased by 1 each time an acknowledgment is received, and a quantity of data packets allowed to be sent in the second RTT is determined by the value of cwnd.

(2) Active congestion control algorithm: Starting from the second RTT, a sending rate is calculated using an existing congestion control algorithm.

Further, the network device 210 performs differentiated buffering and forwarding based on the identified data packet sent in the initial RTT and the identified data packet sent in the non-initial RTT.

Figure 7:
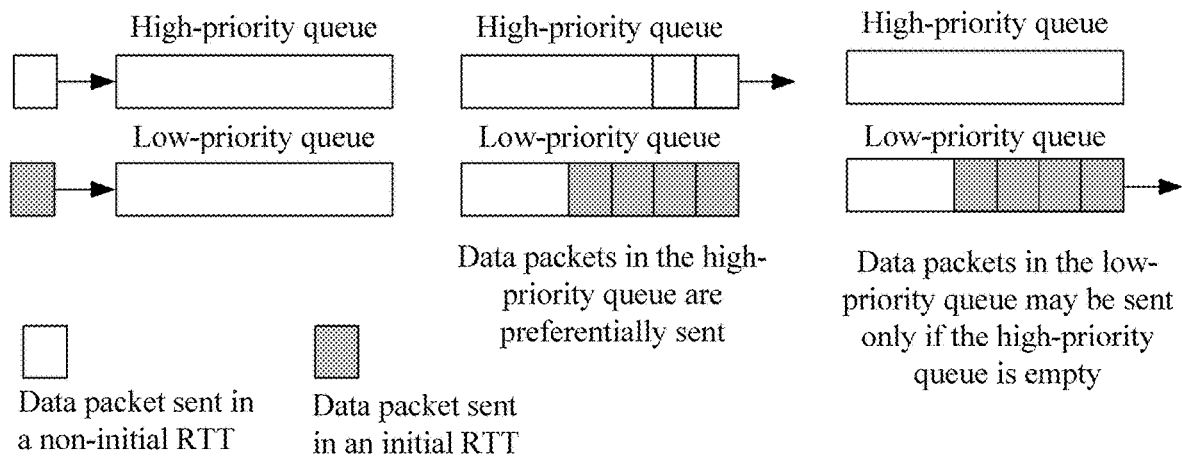
FIG. 7 is a schematic diagram of data transmission based on a high-priority queue and a low-priority queue according to an embodiment of this application.

In an embodiment, as shown in FIG. 7, the network device 210 includes a plurality of priority queues, such as a high-priority queue and a low-priority queue, and the network device 210 buffers the data packet sent in the initial RTT to the low-priority queue, and buffers the data packet sent in the non-initial RTT to the high-priority queue. The data packet in the high-priority queue is preferentially forwarded. The data packet in the low-priority queue is forwarded only when the high-priority queue is empty or a depth of the high-priority queue is less than a preset threshold. A queue depth is a quantity of data packets buffered in a queue. There may be one or more high-priority queues and one or more low-priority queues. For example, the network device 210 has two high-priority queues and two low-priority queues or has three high-priority queues and one low-priority queue.

Figure 8:
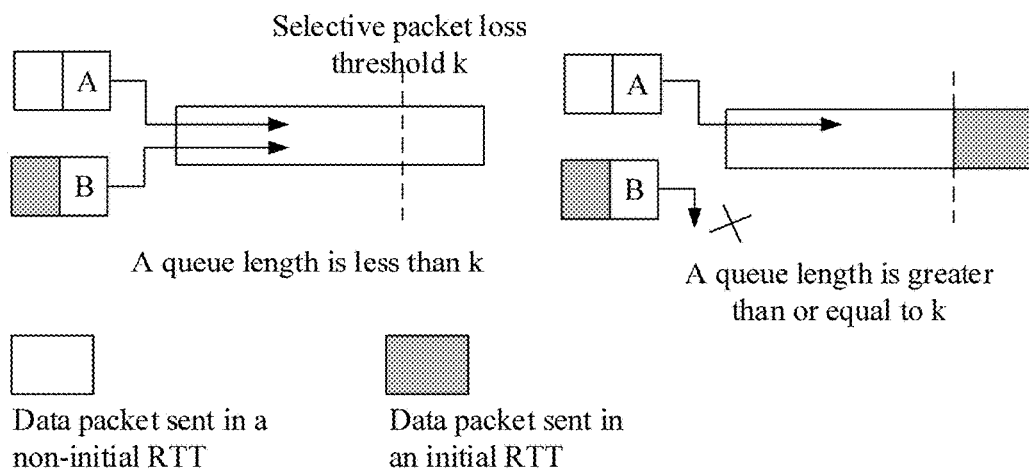
FIG. 8 is a schematic diagram of a selective packet discarding process according to an embodiment of this application.

In another embodiment, as shown in FIG. 8, a selective packet loss threshold k is set for a receive queue of the network device 210. When a depth of the receive queue is less than the threshold k, both the data packet sent in the initial RTT and the data packet sent in the non-initial RTT, that are received by the network device 210, may be buffered to the receive queue. When a depth of the receive queue is greater than or equal to the threshold k, if a currently received data packet is a data packet sent in the initial RTT, the network device 210 discards the data packet. The network device 210 buffers the currently received data packet to the receive queue only if a currently received data packet is a data packet sent in the non-initial RTT and the receive queue is not full. The depth of the receive queue is a quantity of data packets in the receive queue.

In an optional implementation, when the receive queue is full, or the depth of the receive queue is greater than or equal to the threshold k, if the currently received data packet is a data packet sent in the non-initial RTT, the network device 210 may alternatively discard one or more data packets that have been buffered in the receive queue and that are sent in the initial RTT, to provide space for a data packet that is sent in the non-initial RTT and that is newly received.

In an optional implementation, when the receive queue is full, if the currently received data packet is a data packet sent in the non-initial RTT, the network device 210 may alternatively discard the currently received data packet.

In an optional implementation, when the depth of the receive queue is greater than or equal to another threshold s, if the currently received data packet is a data packet sent in the non-initial RTT, the network device 210 may alternatively discard the currently received data packet, where the threshold s is greater than or equal to the foregoing selective packet loss threshold k.

In an optional implementation, when the network device 210 has a plurality of receive queues, different selective packet loss thresholds may be set for different receive queues. For example, a first threshold m is set for a low-priority queue that is used to buffer a data packet sent in the initial RTT, and a first threshold n is set for a high-priority queue that is used to buffer a data packet sent in the non-initial RTT, where m<n. In this way, when a depth of the low-priority queue is greater than or equal to m, if the network device 210 has received the data packet sent in the initial RTT, the data packet is discarded, and when a depth of the high-priority queue is greater than or equal to n, if the network device 210 has received the data packet sent in the non-initial RTT, the data packet is discarded.

Figure 9:
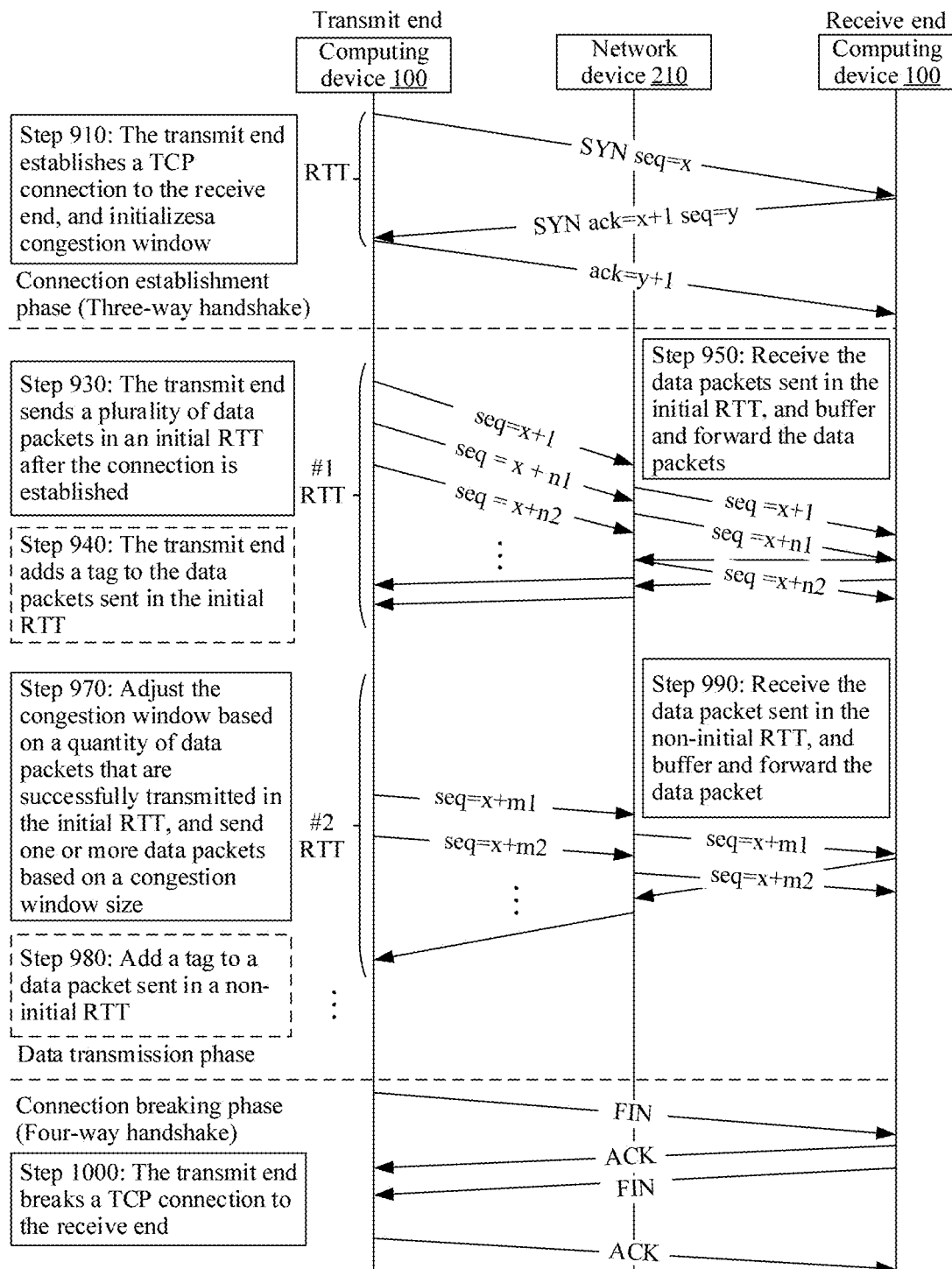
FIG. 9 is a flowchart of another data transmission method according to an embodiment of this application.

FIG. 9 is a schematic flowchart of a data transmission method to which an embodiment of this application is applied when a computing device 100 performs data transmission based on a TCP. It should be understood that the TCP is only a transmission protocol that may be used by the computing device, and other transmission protocols may also be applicable to the method in this embodiment of this application. For ease of description, one of two computing devices 100 that perform data transmission using a network device 210 in this embodiment of this application is referred to as a transmit end, and the other is referred to as a receive end. As shown in FIG. 9, the data transmission method includes the following steps.

Step 910: The transmit end establishes a TCP connection to the receive end.

Figure 10:
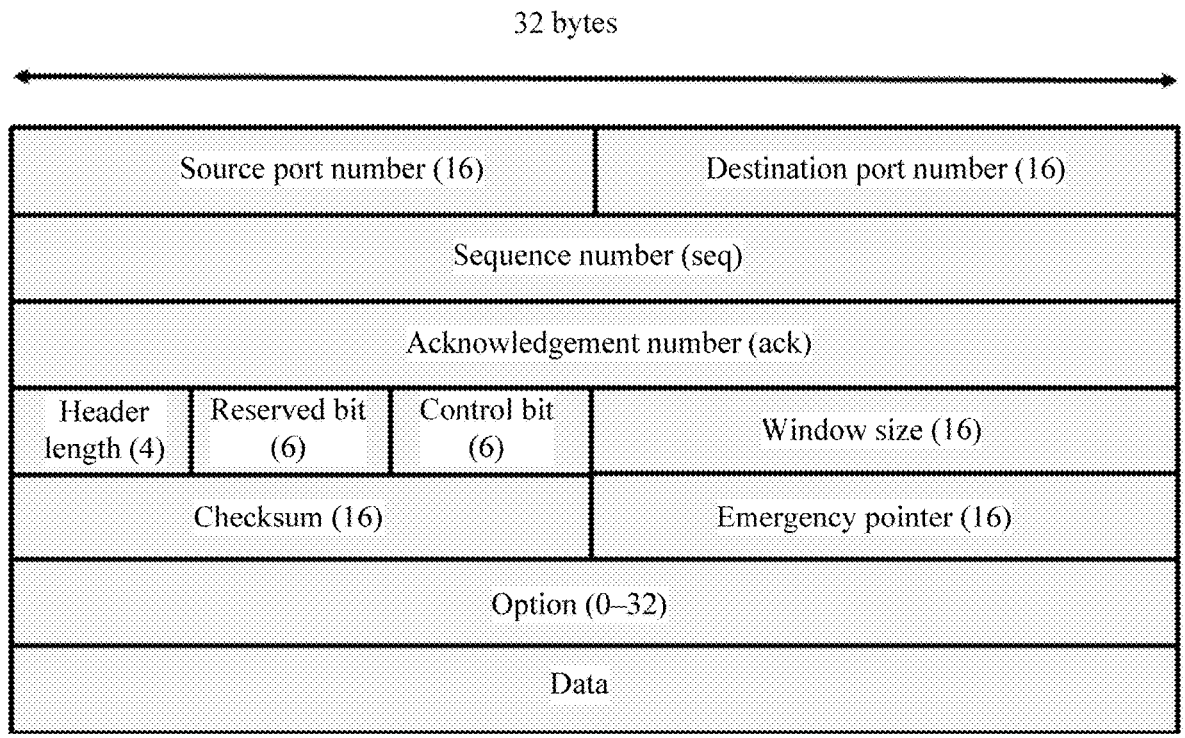
FIG. 10 is a schematic diagram of a format of a TCP data packet according to an embodiment of this application.

In an embodiment, establishment of the TCP connection may be initiated by an application in the transmit end. The application generates a socket open command. The command is transferred to a protocol stack of the transmit end, to trigger the protocol stack to establish the TCP connection to the receive end using three times of message interaction (three-way handshake), and then the protocol stack notifies the application that the connection has been established. A format of a TCP data packet is shown in FIG. 10. A source port number and a destination port number are used to determine an application process of the transmit end and the receive end. A TCP connection may be uniquely determined using a 5-tuple (a source port number, a destination port number, a source IP address, a destination IP address, and a transport layer protocol number). Data packets transmitted on the TCP connection form a data flow. In other words, data packets in a same data flow have a same 5-tuple. A sequence number (seq) field of a header of a TCP data packet is used to indicate a sequence number of the data packet. Generally, the sequence number of the data packet is a sequence number of a first data byte in a data packet payload. After receiving the TCP data packet, the receive end sends an ACK to the transmit end. A window size is used to indicate a size of a current receive buffer area of a receive end. In addition, the header of the TCP data packet further has six control bits and a user-defined option field. The option field may be used to carry additional information. The six control bits are defined as follows:

URG: An urgent pointer is valid.

ACK: An ACK number is valid.

PSH: Perform immediate sending to an application layer for processing.

RST: Resetting is abnormal.

SYN: Synchronization flag. When it is set to 1, a connection needs to be established.

FIN: Termination flag, requesting to release a connection.

Referring to FIG. 9, that the transmit end establishes a TCP connection to the receive end using a three-way handshake is as follows:

(1) The transmit end first sends a synchronize (SYN) packet to the receive end, and instructs the receive end to request to establish a connection, where the SYN packet is a TCP packet in which only SYN control bits are set to 1 (refer to a TCP data packet format in FIG. 10).

(2) After receiving the SYN packet, the receive end returns an ACK (SYN/ACK) of the SYN packet to the transmit end to indicate ACK of a first SYN packet, where the SYN/ACK packet is a packet in which only the SYN and the ACK are marked as 1.

(3) After receiving the SYN/ACK packet, the transmit end sends an ACK packet to the receive end, to notify the receive end that the connection has been established. At this point, the three-way handshake is completed and the TCP connection is established.

Step 930: The transmit end sends a plurality of data packets in an initial RTT after the connection is established.

Based on a slow start mechanism in an existing congestion control algorithm, a congestion window size cwnd is initialized to 1, and the transmit end sends only one data packet in the initial RTT after the connection is established. In this embodiment of this application, a plurality of data packets is sent in the initial RTT after the connection is established. In other words, network bandwidth is fully utilized in the initial RTT, to send data packets at a relatively high rate. Further, to achieve a purpose of sending the plurality of data packets in the initial RTT, the transmit end may initialize the congestion window size cwnd to a relatively large value (cwnd=n, n>1), and then send a corresponding quantity of data packets based on the initialized cwnd. It can be understood that, the sender can still initialize the congestion window size to 1 (cwnd=1) in an existing manner, but enable the congestion window not to work in the initial RTT using another means.

Step 950: When the plurality of data packets sent in the initial RTT of the transmit end pass through the network device 210, the network device 210 buffers the plurality of data packets to a receive queue, and forwards the plurality of data packets on appropriate occasions in sequence.

Step 970: The transmit end adjusts the congestion window size cwnd based on a quantity of data packets that are successfully received by the receive end and that are in the data packets sent in the initial RTT, and sends a corresponding quantity of data packets in the second RTT based on adjusted cwnd. The second RTT herein is a next RTT after the initial RTT. The RTT is an estimated value. For a specific estimation method, refer to the other approaches. Details are not described herein.

In an embodiment, when successfully receiving a data packet each time, the receive end returns a corresponding ACK to the transmit end. In another embodiment, the receive end may also carry an extension option, for example, a selective ACK (SACK), using a data packet, to indicate a plurality of data packets that are successfully received. The transmit end may determine, based on the ACK received from the receive end, the data packets that are successfully received by the receive end, to adjust cwnd.

In an embodiment, if a quantity of data packets that are successfully received by the receive end and that are in the data packets sent in the initial RTT is m, cwnd may be adjusted to m+1, or a value having a linear constraint relationship with m.

In an embodiment, congestion control algorithms such as slow start and congestion avoidance may be used to adjust the congestion window size cwnd. A process of the slow start algorithm is as follows:

(1) Initialize a congestion window cwnd to 1, indicating that a data packet can be sent.

(2) When an ACK is received each time, cwnd++ is implemented, and cwnd rises linearly.

(3) When an RTT passes each time, cwnd=cwnd*2.

Certainly, cwnd cannot increase without limit. Therefore, the transmit end further sets an ssthresh that indicates an upper limit of a congestion window. When cwnd>=ssthresh, the congestion avoidance algorithm may be triggered. A typical congestion avoidance algorithm is as follows:

(1) When an ACK is received, cwnd=cwnd+1/cwnd.

(2) When an RTT passes each time, cwnd=cwnd+1.

In this way, network congestion caused by an excessive data packet increase can be avoided, and gradually the increase is adjusted to an optimal value of a network.

Step 990: After receiving the data packets sent in the second RTT, the network device 210 buffers the data packets to the receive queue and forwards the data packets in sequence.

Step 1000: After data transmission is completed, the transmit end breaks a connection to the receive end. In an embodiment, if a connection between the transmit end and the receive end is a TCP connection, the transmit end may further break the connection to the receive end using a four-way handshake. For a specific process, refer to related description in the other approaches. Details are not described herein.

Similar to the embodiment shown in FIG. 6, the network device 210 may perform differentiated operations on a data packet sent in the initial RTT and a data packet sent in a non-initial RTT.

The network device 210 may use various manners to distinguish the data packet sent by the transmit end in the initial RTT and the data packet sent by the transmit end in the non-initial RTT. For example, the transmit end may add a first tag to the data packet sent in the initial RTT or add a second tag to the data packet sent in the non-initial RTT, or the transmit end may mark both the data packet sent in the initial RTT and the data packet sent in the non-initial RTT. The first tag or the second tag may be located in a field, for example, an option field, a reserved field, or a control bit field, of a header of the data packet. In an embodiment, the first tag or the second tag may be an ECN bit of the header of the data packet. When the ECN bit is a specific value (for example, 0 or 1), the ECN bit is used to indicate that the data packet is a data packet sent in the initial RTT. Correspondingly, after receiving any data packet, the network device 210 can determine, based on the tag carried in the data packet, whether the data packet is a data packet sent in the initial RTT. For another example, the network device 210 may also maintain a flow table for recording data flow information, and perform new and old flow classification based on the flow table, to determine whether the data packet is sent in the initial RTT. For related details of determining, by searching the flow table, whether the data packet is sent in the initial RTT, refer to the foregoing embodiments. Details are not described herein again.

Further, the network device 210 performs differentiated buffering and forwarding based on the identified data packet sent in the initial RTT and the identified data packet sent in the non-initial RTT. For example, the network device 210 may use a high-priority queue and a low-priority queue to perform differentiated buffering on the data packet sent in the initial RTT and the data packet sent in the non-initial RTT. For specific details, refer to the related embodiment of FIG. 7. For another example, when a depth of a receive queue exceeds a selective packet loss threshold, the network device 210 may use a selective packet discard solution shown in FIG. 8 to discard one or more data packets sent in the initial RTT.

According to the data transmission method provided in the embodiments of this application, the transmit end sends a large quantity of the data packets in the initial RTT of the data transmission phase between the transmit end and the receive end such that free network bandwidth is fully utilized to quickly start a new data flow without a delay. In addition, flow classification is performed using whether a data flow is a new flow as a standard, and different network transmission priorities are set for different flows in order to prevent a case that a data packet of a new flow interferes with transmission of a data packet of an old flow, which causes network congestion. In other words, according to the data transmission method provided in the embodiments of this application, a better balance is achieved between network bandwidth utilization and network congestion probability, and network congestion is avoided as much as possible while network bandwidth is fully utilized.

In an embodiment, the functions of the transmit end described in the embodiments related to FIG. 6 to FIG. 9 are implemented by the protocol stack 25 of the computing device 100, as shown in FIG. 3. Correspondingly, functions of the network device 210 described in the foregoing embodiments may also be implemented by a protocol stack of the network device 210. The protocol stack 25 of the computing device 100 may be executed by an appropriate combination of software, hardware, and/or firmware in the computing device 100. For example, in a possible implementation, the protocol stack 25 is stored in the memory 130 in a form of an executable program, and the processor 110 of the computing device 100 runs the executable program corresponding to the protocol stack, to perform some or all of the steps of the transmit end described in the foregoing method embodiments.

In a possible implementation, the protocol stack 25 is a separate executable program, and the operating system 131 invokes the protocol stack through an interface to perform data packet processing and transmission. In another possible implementation, the protocol stack 25 may alternatively be included in the operating system 131 as a part of the kernel 23 of the operating system. In addition, the protocol stack may be classified into a plurality of protocol components or modules based on protocol levels or functions. Each component implements a function of one layer protocol. For example, a network layer protocol component is configured to implement a network layer protocol (for example, an IP), and a transport layer protocol component is configured to implement a transport layer protocol (for example, a TCP or User datagram Protocol (UDP)).

It should be noted that the term "executable program" used in the embodiments of this application should be broadly explained as including, but not limited to, an instruction, an instruction set, code, a code segment, a subprogram, a software module, an application, a software package, a thread, a process, a function, firmware, middleware, or the like.

The functions of the transmit end described in the embodiments related to FIG. 6 to FIG. 9 may also be implemented by the network interface card 150 of the computing device 100. In a possible implementation, as shown in FIG. 4, the network interface card 150 is a programmable network interface card. The function of the transport layer protocol component 255 may be implemented by a hardware circuit or a special-purpose chip, for example, an FPGA or an ASIC. The hardware circuit or the special-purpose chip may be integrated in the programmable network interface card 150. In another possible implementation, the network interface card 150 includes a processor, a memory, and an input/output port, where the input/output port is configured to receive and send a data packet, the memory is configured to buffer the received data packet or the to-be-sent data packet, and the processor runs a program in the memory to implement the functions of the transmit end described in the embodiments related to FIG. 6 to FIG. 9.

It can be understood that the data transmission method described in the embodiments of this application is applied to data transmission between a transmit end and a receive end in a network such as a data network, the Internet, or a local area network. The transmit end and the receive end are devices that establish a communication connection and have a data transceiving capability, for example, a computer, a terminal device, a server, a switch, and a router.

Figure 11:
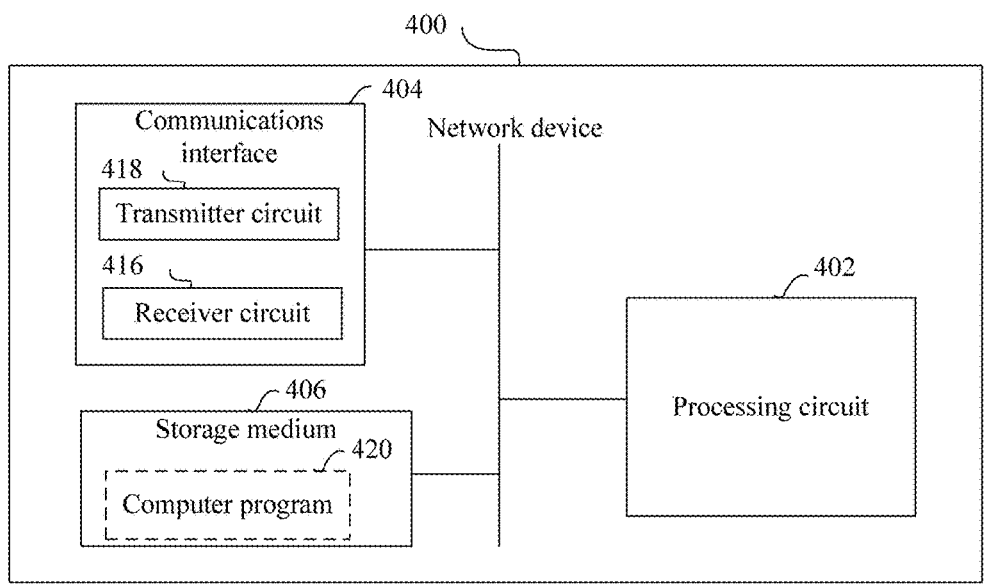
FIG. 11 is a schematic structural diagram of a network device according to an embodiment of this application.

An embodiment of this application further provides a network device 400. As shown in FIG. 11, the network device 400 includes a processing circuit 402, and a communications interface 404 and a storage medium 406 that are connected to the processing circuit 402.

The processing circuit 402 is configured to process data, control data access and storage, send a command, and control another component to perform an operation. The processing circuit 402 may be implemented as one or more processors, one or more controllers, and/or another structure that can be used to execute a program. The processing circuit 402 may further include at least one of a general-purpose processor, a digital signal processor (DSP), an ASIC, an FPGA, or another programmable logic component. The general-purpose processor may include a microprocessor, or any conventional processor, controller, microcontroller, or state machine. The processing circuit 402 may alternatively be implemented as a computing component, for example, a combination of a DSP and a microprocessor.

The storage medium 406 may include a computer readable storage medium, such as a magnetic storage device (for example, a hard disk, a FLOPPY DISK, or a magnetic strip), an optical storage medium (for example, a digital versatile disk (DVD)), a smart card, a flash storage device, a RAM, a ROM, a programmable ROM (PROM), an erasable PROM (EPROM), or a register, or any combination thereof. The storage medium 406 may be coupled to the processing circuit 402 such that the processing circuit 402 can read information from and write information to the storage medium 406. Further, the storage medium 406 may be integrated to the processing circuit 402, or the storage medium 406 and the processing circuit 302 may be separate.

The communications interface 404 may include a circuit and/or a program, to implement bidirectional communications between the network device 400 and one or more wireless network devices (for example, a router, a switch, and an access point). The communications interface 404 includes at least one receiver circuit 416 and/or at least one transmitter circuit 418. In an embodiment, the communications interface 404 may be entirely or partially implemented by a wireless modem.

In an embodiment, the storage medium 406 stores a protocol stack program 420, and the processing circuit 402 is configured to execute the protocol stack program 420 stored in the storage medium 406, to implement some or all functions of the network device in the embodiments related to FIG. 6 to FIG. 9.

Based on the data transmission method described in the foregoing embodiments, an embodiment of this application further provides a data transmission system.

Figure 12:
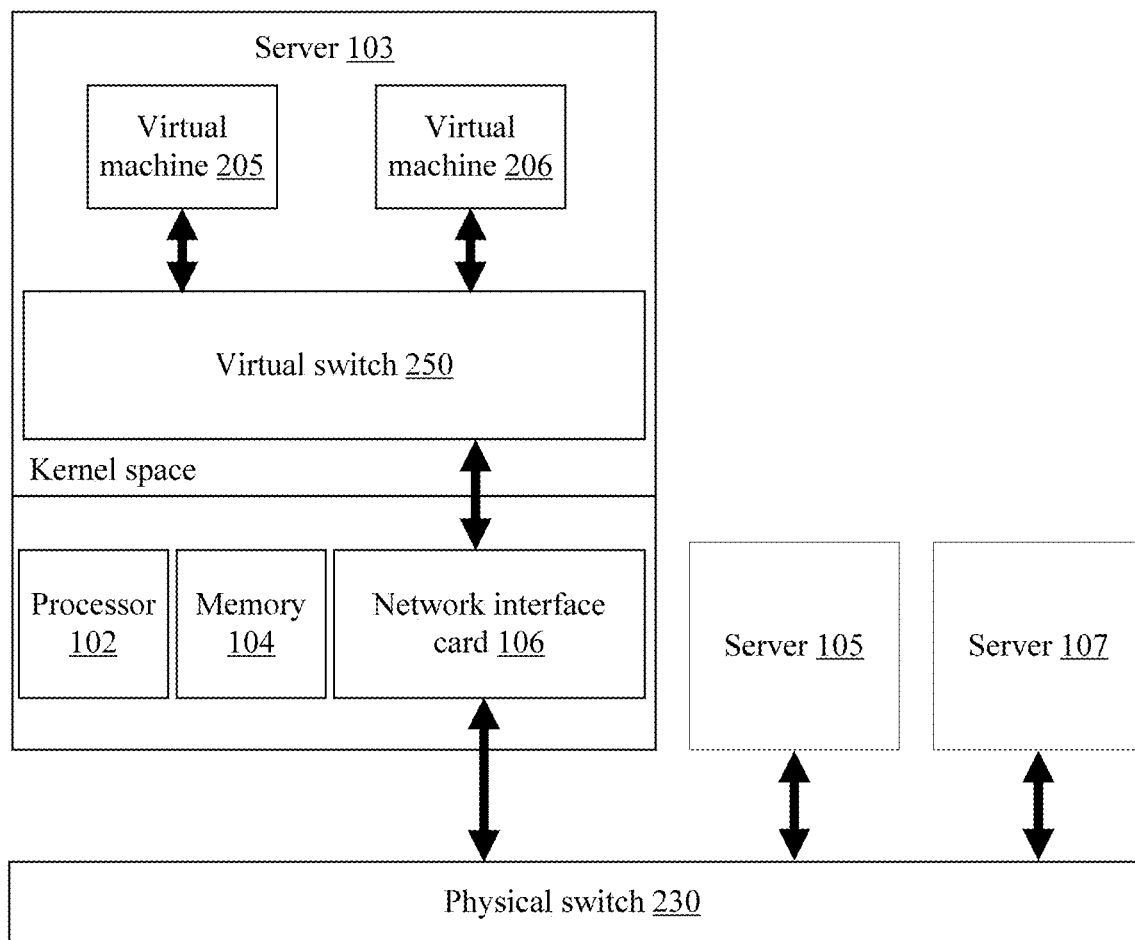
FIG. 12 is a schematic architectural diagram of another data transmission system according to an embodiment of this application.

As shown in FIG. 12, the system includes a plurality of servers (for example, servers 103, 105, and 107 shown in FIG. 12) that are connected using a physical switch 230. Take the server 103 as an example, hardware of the server 103 includes a processor 102, a memory 104, and a network interface card 106, software of the server 103 includes a virtual switch 250 and virtual machines (VMs) 205 and 206, the VM 205 and the VM 206 in the server 103 communicate with each other using the virtual switch 250, and the VM 205 and the VM 206 communicate with a VM in another server using the virtual switch 250 and the network interface card 106. The server 103 is configured to implement functions of the transmit end described in the embodiments related to FIG. 6 to FIG. 9, and the physical switch 230 is configured to implement functions of the network device described in the embodiments related to FIG. 6 to FIG. 9. Further, in an embodiment, the server 103 may execute an executable program in the memory 104 using the processor 102, to implement the functions of the transmit end described above. It can be understood that, during a program execution process, if sending a data packet to the outside (for example, sending a data packet to another server) is related, a driver of the network interface card 106 needs to be invoked to drive the network interface card 106 to perform an operation of sending the data packet. In another embodiment, the server 103 may alternatively implement the functions of the foregoing described transmit end independently using the network interface card 106. For example, the functions may be implemented by a hardware circuit or a special-purpose chip, for example, an FPGA or an ASIC, integrated in the network interface card 106.

The data transmission system is merely an example, and a data transmission system applicable to the technical solutions of the present disclosure is not limited thereto. For example, a container or other virtual operating system software may also be installed in the server, there may also be another quantity for servers, and hardware included in each server is also not limited to the hardware shown in FIG. 12.

In the several embodiments provided in this application, it should be understood that the disclosed method and apparatus may be implemented in other manners. For example, the foregoing described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions in this application essentially, or the part contributing to the other approaches, or some of the technical solutions may be implemented in a form of a software product. The computer software product is stored in a storage medium, and includes a plurality of instructions for instructing a computer device (which may be a terminal device, a server, or a network device) to perform all or some of the steps of the methods described in the embodiments of this application. The foregoing storage medium includes any medium that can store an executable program, such as a USB flash drive, a removable hard disk, a ROM, a RAM, a magnetic disk, or an optical disc.

What is claimed is:

1. A data transmission method implemented by a network device, wherein the data transmission method comprises:
  receiving a first data packet from a transmit end;
  buffering the first data packet to a low-priority queue when the first data packet is sent by the transmit end during a first round-trip time (RTT) of a data transmission phase between the transmit end and a receive end;
  receiving a second data packet from the transmit end;
  buffering the second data packet to a high-priority queue when the second data packet is not sent by the transmit end during the first RTT; and
  forwarding the second data packet in the high-priority queue before the first data packet in the low-priority queue.

2. The data transmission method of claim 1, further comprising determining whether the first data packet and the second data packet are sent by the transmit end during the first RTT.

3. The data transmission method of claim 2, wherein the first data packet carries a first tag from the transmit end indicating that the first data packet was sent during the first RTT, and wherein the data transmission method further comprises determining, based on the first tag, that the first data packet is sent by the transmit end during the first RTT.

4. The data transmission method of claim 2, wherein the second data packet carries a second tag from the transmit end indicating that the second data packet was not sent during the first RTT, and wherein the data transmission method further comprises determining, based on the second tag, that the second data packet is not sent by the transmit end during the first RTT.

5. The data transmission method of claim 2, further comprising:
searching a flow table based on first characteristic information of the first data packet to determine whether the first data packet is sent by the transmit end during the first RTT; and
searching the flow table based on second characteristic information of the second data packet to determine whether the second data packet is not from the transmit end during the first RTT.

6. A network device comprising:
a memory configured to store an executable program; and
a processor coupled to the memory, wherein when executed by the processor, the executable program causes the network device to be configured to:
receive a first data packet from a transmit end;
buffer the first data packet to a low-priority queue when the first data packet is sent by the transmit end during a first round-trip time (RTT) of a data transmission phase between the transmit end and a receive end;
receive a second data packet from the transmit end;
buffer the second data packet to a high-priority queue when the second data packet is not sent by the transmit end during the first RTT; and
forward the second data packet in the high-priority queue before the first data packet in the low-priority queue.

7. The network device of claim 6, wherein when executed by the processor, the executable program further causes the network device to be configured to determine whether the first data packet and the second data packet are sent by the transmit end during the first RTT.

8. The network device of claim 7, wherein the first data packet carries a first tag from the transmit end indicating that the first data packet was sent during the first RTT, and wherein when executed by the processor, the executable program further causes the network device to be configured to determine, based on the first tag, that the first data packet is sent by the transmit end during the first RTT.

9. The network device of claim 7, wherein the second data packet carries a second tag from the transmit end indicating that the second data packet was not sent during the first RTT, and wherein when executed by the processor, the executable program further causes the network device to be configured to determine, based on the second tag, that the second data packet is not sent by the transmit end during the first RTT.

10. The network device of claim 7, wherein the memory is further configured to store a flow table, wherein the flow table comprises characteristic information of one or more data flows, and wherein when executed by the processor, the executable program further causes the network device to be configured to:
search the flow table based on first characteristic information of the first data packet to determine whether the first data packet is sent by the transmit end during the first RTT; and
search the flow table based on second characteristic information of the second data packet to determine whether the second data packet is not from the transmit end during the first RTT.

11. A network device comprising:
a memory configured to store an executable program; and
a processor coupled to the memory, wherein when executed by the processor, the executable program causes the network device to be configured to:
receive a data packet from a transmit end;
discard the data packet when the data packet is sent by the transmit end during a first round-trip time (RTT) of a data transmission phase between the transmit end and a receive end and when a quantity of data packets in a receive queue of the network device exceeds a threshold; and
add the data packet to the receive queue when the data packet is not sent by the transmit end during the first RTT and the receive queue is not full.

12. The network device of claim 11, wherein when executed by the processor, the executable program further causes the network device to be configured to discard the data packet when the data packet was not sent by the transmit end during the first RTT and the receive queue is full.

13. The network device of claim 11, wherein when executed by the processor, the executable program further causes the network device to be configured to discard one data packet in the receive queue that is sent by the transmit end during the first RTT when the data packet was not sent by the transmit end during the first RTT and the receive queue is full.

14. The network device of claim 11, wherein when executed by the processor, the executable program further causes the network device to be configured to determine whether the data packet was sent by the transmit end during the first RTT.

15. The network device of claim 11, wherein the data packet carries a first tag from the transmit end indicating that the data packet was sent during the first RTT, and wherein when executed by the processor, the executable program further causes the network device to be configured to determine, based on the first tag, that the data packet was sent by the transmit end during the first RTT.

16. The network device of claim 11, wherein the data packet carries a second tag from the transmit end indicating that the data packet was not sent during the first RTT, and wherein when executed by the processor, the executable program further causes the network device to be configured to determine, based on the second tag, that the data packet was not sent by the transmit end during the first RTT.

17. The network device of claim 11, wherein the memory is further configured to store a flow table, wherein the flow table comprises characteristic information of one or more data flows, and wherein when executed by the processor, the executable program further causes the network device to be configured to search the flow table based on characteristic information of the data packet to determine whether the data packet was sent by the transmit end during the first RTT.

18. A network interface card comprising:

an input/output port; and a processor coupled to the input/output port and configured to cause the network interface card to:
- send a plurality of first data packets during a first round-trip time (RTT) of a data transmission phase between a transmit end and a receive end through the input/output port;
- add a first tag to each of the first data packets before sending the first data packets to enable a network device to buffer the first data packets to a low-priority queue or to discard the first data packets after receiving the first data packets; and
- send a plurality of second data packets to the network device to enable the network device to buffer the second data packets to a high-priority queue of the network device, wherein the second data packets do not carry the first tag.

19. The network interface card of claim 18, wherein the processor is further configured to cause the network interface card to:
- determine a quantity of third data packets that are successfully received by the receive end and that are in the first data packets;
- determine, based on the quantity of the third data packets, a quantity or a sending rate of fourth data packets sent during a second RTT; and
- send one or more fifth data packets during the second RTT based on the quantity or the sending rate of the fourth data packets.

20. The network interface card of claim 19, wherein the processor is further configured to cause the network interface card to add a second tag to the fifth data packets to enable the network device to buffer the fifth data packets to the high-priority queue after receiving the fifth data packets, and wherein the first data packets do not carry the second tag.

* * * * *